(12) United States Patent
Shin et al.

(10) Patent No.: US 7,077,310 B2
(45) Date of Patent: Jul. 18, 2006

(54) DUAL ID VERIFICATION SYSTEM AND SWITCHING METHOD THEREFOR

(75) Inventors: Jui-An Shin, Kaohsiung (TW); Shun-An Chen, Kaohsiung (TW); Ko-Pin Chang, Tainan (TW); Hui-Tang Liu, Yungkang (TW); James You, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 143 days.

(21) Appl. No.: 10/655,049

(22) Filed: Sep. 4, 2003

(65) Prior Publication Data
US 2005/0051616 A1    Mar. 10, 2005

(51) Int. Cl.
*G06F 17/00* (2006.01)

(52) U.S. Cl. .................................. 235/375; 235/376

(58) Field of Classification Search ............... 235/375, 235/376; 257/678
See application file for complete search history.

(56) References Cited

U.S. PATENT DOCUMENTS 5,265,170 A * 11/1993 Hine et al. ................. 382/145
6,265,684 B1 * 7/2001 Wu ............................. 209/583

* cited by examiner

*Primary Examiner*—Thien M. Le
*Assistant Examiner*—Lisa M. Caputo
(74) *Attorney, Agent, or Firm*—Thomas, Kayden, Horstemeyer & Risley

(57) ABSTRACT

A method for switch dual Id verification systems for installing another carrier ID system on an equipment installation complying with SEMI E87. A first identification access system has internally installed on an equipment installation on which a second identification access system is then installed. Both systems are switched using a control flow and a wafer carrier ID is obtained by the chosen verification system.

18 Claims, 5 Drawing Sheets

DUAL ID VERIFICATION SYSTEM AND SWITCHING METHOD THEREFOR

BACKGROUND OF THE INVENTION

1. Field of the Invention

The present invention relates to a method for switching systems, and in particular to a method for switching dual ID systems installed on equipment complying with SEMI (Semiconductor Equipment and Materials Institute) standard E87.

2. Description of the Related Art

Automated identification systems are widely applied in integrated circuit (IC) manufacturing, such as wafer process, mask process, metal damascene process, oxidation process, and so on. The goal of automated identification is to utilize computers to check errors that may occur during the process by automated monitoring. Computers with automated control technology can manage the wafer fab with minimal operator presence, tracking the entire production process of each wafer by identification label. Manual operation can create mistakes monitoring the production process and identifying identification labels, such as incorrect determinations regarding process events, or during heavy loading.

Carriers must be identified during the semiconductor manufacturing process. In the simplest method, a label with carrier ID or bar code thereof is attached, but problems arise if more information must be recorded for the carrier. The carrier can also be identified by an automated identification system in addition to the label. For equipment automation, automatic identification of the carrier is a basic requirement.

In the separate communication connection system, a host utilizes an identification access device (such as Smart Tag Reader/Writer System) to retrieve the identification data of the wafer carrier through a separate wire link, rather than the tool SECS link. Although the separate wire link is suitable for common equipment, some problems remain.

First, the current Smart Tag solution requires special hardware and add-on deployment and maintenance efforts created additional cabling. Second, the architecture does not comply with the single communication connection requirement in SEMI standard E87. All equipment suppliers comply with SEMI standard in implementation of the equipment installation. If manufacturers do not follow the standard, extra costs are incurred when equipment suppliers must modify their original design for equipment compliance. Third, the identification data for wafer carrier is stored in an identification access device (herein Smart Tag) whose battery must be charged periodically. The identification access device will not work if the battery is not charged.

Furthermore, the separate wire link does not comply with the tool SECS link, such that the host connects to the identification access device directly to access the identification data of the wafer carrier.

FIG. 1 is a flowchart showing implementation of a conventional automated identification system with separate wire link.

In step S11, the equipment installation issues a "load complete" message to the host after the wafer carrier reaches the load port of the equipment installation and the load button thereof is activated.

In step S12, the host directly controls the Smart Tag System through a separate wire link and reads the wafer carrier ID from Smart Tag.

In step S13, the host compares the retrieved wafer carrier ID with product ID numbers from a product ID table established in the manufacturing management system. The retrieved wafer carrier ID is checked by intelligent ID verification.

In step S141, the host issues a "proceed with carrier" request to the equipment installation to continue the manufacturing process if the intelligent ID verification is successful.

In step S142, the host issues a "Cancel Carrier At Port" request to the equipment installation to stop the manufacturing process if the intelligent ID verification is unsuccessful.

In the single communication connection system, the identification access device is installed on The equipment installation. The host issues a request to an equipment installation controller residing on The equipment installation through a single wire link complying with tool SECS link to retrieve the identification data from the wafer carrier and control equipment actions. SEMI standard E87 defines specification for Carrier Management (CMS). For the connection of the identification system, E87 defines a "Single Connection Requirement", by which the automated identification system must be integrated into the equipment installation and the host accesses identification data through the tool SECS link only. All actions related to the equipment installation and automated identification systems are performed through The equipment installation internal controller.

FIG. 2 is a flowchart showing implementation of a conventional automated identification system with single wire link.

In step S21, the equipment installation issues a "load complete" message to the host after the wafer carrier reaches the load port of the equipment installation and the load button thereof is activated.

In step S22, the equipment installation issues an access request through the single wire link to inform the equipment installation controller it will read the wafer carrier ID stored in the identification access device (herein RF Tag). The equipment installation then uses an identification access system (herein RF Tag Reader/Writer System) by internal connection to retrieve the wafer carrier ID from the identification access device (herein RF Tag).

In step S23, the system chooses if the equipment installation has successfully read the wafer carrier ID.

In step S241, the equipment installation sends a message comprising wafer carrier ID to the equipment installation controller if it has successfully read the wafer carrier ID, and the equipment installation informs the host of the transmission.

In step S242, the equipment installation sends a "read fail" message to the equipment installation controller if it has failed to read the wafer carrier ID, and the equipment installation informs the host of the transmission.

In step S25, the host receives the message comprising wafer carrier ID from equipment controller.

In step S26, the host compares the retrieved wafer carrier ID with product ID numbers from a product ID table established in manufacturing management system. The retrieved wafer carrier ID is checked by an intelligent ID verification.

In step S271, the host issues a "proceed with carrier" request to the equipment installation to continue the manufacturing process if the intelligent ID verification is successful.

In step S272, the host issues a "Cancel Carrier At Port" request to the equipment installation to stop the manufacturing process if the intelligent ID verification is unsuccessful.

Nevertheless, environments supporting automated identification systems with separate communication connection can experience extra costs when introducing an automated identification system with single communication connection.

SUMMARY OF THE INVENTION

Accordingly, an object of the present invention is to provide a method for switching dual ID verification systems, switching a first identification access system and a second identification access system simultaneously installed on equipment.

According to the object described above, the present invention provides a method for switching dual ID verification systems. A first identification access system is installed on equipment, complying with SEMI standard E87, and then a second identification access system is installed, wherein the first identification access system and the second identification access system are switched by a switch method.

In the first identification access system, the equipment installation issues an access request through a first wire link to an equipment installation controller for the first identification access system to read the wafer carrier ID from a first identification access device. The host then receives the wafer carrier ID from the first identification access system.

In the second identification access system, the host receives the wafer carrier ID by the second identification access system through a second wire link.

Finally, the wafer carrier ID is compared with product ID numbers from the product ID table in MES. The manufacturing process is continued if the comparison is successful, and, if not, is canceled.

The present invention further provides a system of intelligent ID verification, comprising a first identification access device, a second identification access device, an equipment installation controller, a host, and a control flow unit.

The control flow unit chooses whether to execute the first identification access system or the second identification access system by a switch method, wherein the first identification access system complying with SEMI standard E87.

If the first identification access system is chosen, the equipment installation issues an access request through a first wire link to an equipment installation controller for the first identification access system to read the wafer carrier ID from a first identification access device. The host then receives the wafer carrier ID by the first identification access system.

If the second identification access system is chosen, the host receives the wafer carrier ID by the second identification access system through a second wire link.

Finally, the wafer carrier ID is compared with product ID numbers from the product ID table in MES. The manufacturing process is continued if the comparison is successful, and, if not, is canceled.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention discloses a dual ID verification system and switching method therefor.

Figure 1:
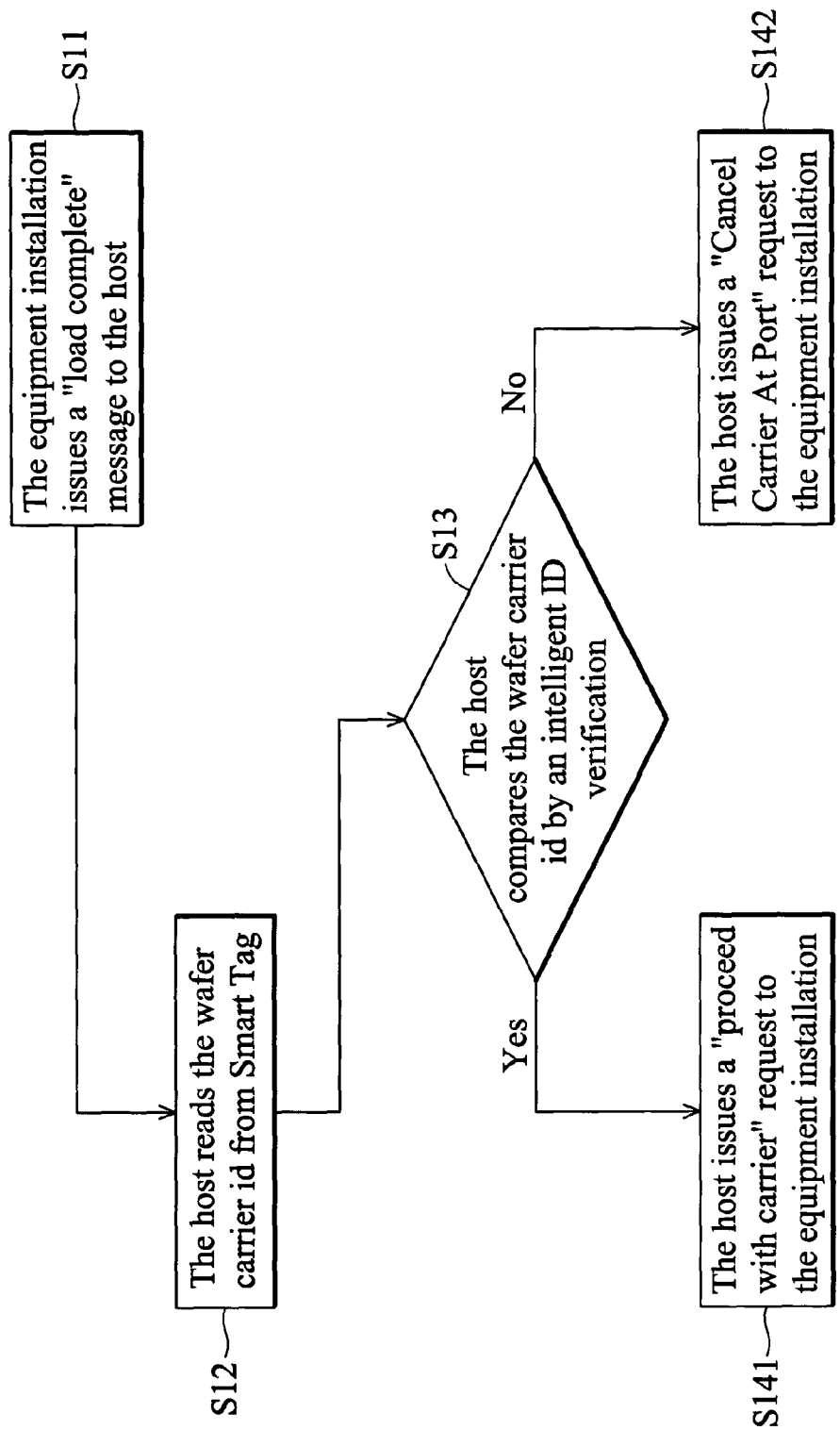
FIG. 1 is a flowchart showing implementation of a conventional automated identification system with separate wire link.
Figure 2:
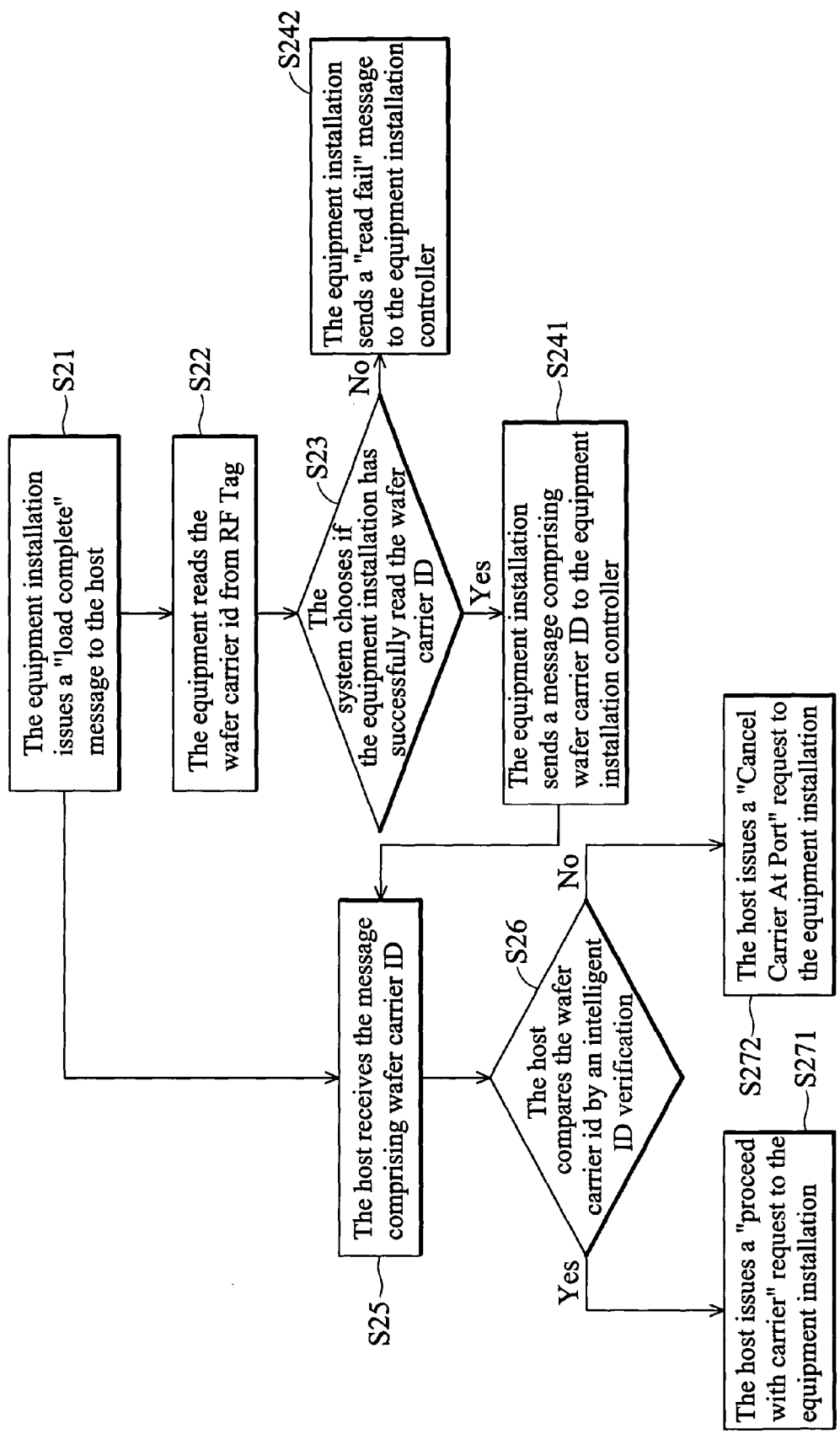
FIG. 2 is a flowchart showing implementation of a conventional automated identification system with single wire link.
Figure 3:
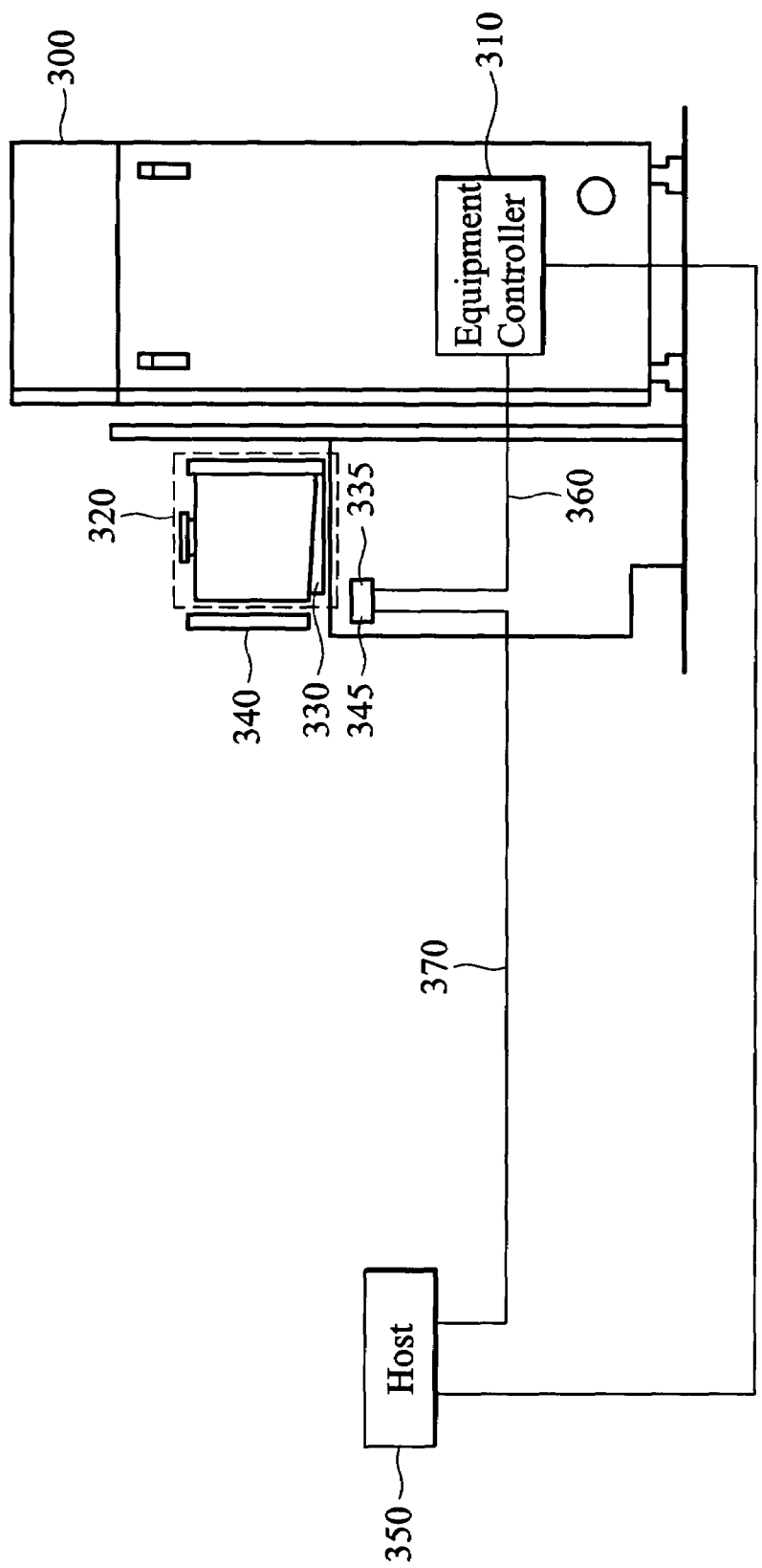
FIG. 3 is a diagram showing switching both verification systems installed on equipment by the method according to the present invention.

FIG. 3 is a diagram showing switching both verification systems installed on equipment by the method according to the present invention. The embodiment simultaneously installs two automated identification systems with separate communication connection and single communication connection, switchable by the host.

Equipment 300 controlled by host 350 includes an equipment installation controller 310 and a wafer carrier 320. A first identification device 330 and a second identification access device 340, respectively accessed by a first identification access system 335 and a second identification access system 345 installed on wafer carrier 320.

Host 350 chooses the appropriate system by a switch method, automatically or manually performed, when wafer carrier 320 reaches the load port of the equipment installation 300. The system is determined by operators if it is manually performed, or is determined by a predetermined product variable if it is automatically performed.

If the first identification access system 335 is chosen, the equipment installation 300 issues an access request through a single wire link 360 to inform equipment controller 310 that it will read the wafer carrier ID from first identification access device 330 installed on wafer carrier 320. The first identification access system 335 is then executed to retrieve die wafer carrier ID from the first identification device 330.

If the second identification access system 345 is chosen, the host 350 directly controls and executes the second identification access system 345 through a second wire link 370 and retrieves wafer carrier ID from the second identification access device 340.

Next, the host 350 compares wafer carrier ID with product ID numbers from a product ID table in MES. Wafer carrier ID is checked by a verification process. If the verification is successful, the host 350 sends a proceed-process message to the equipment installation 300 to continue the manufacturing process. If not. host 350 sends a cancel-process message to the equipment installation 300 to cancel the manufacturing process.

Figure 4:
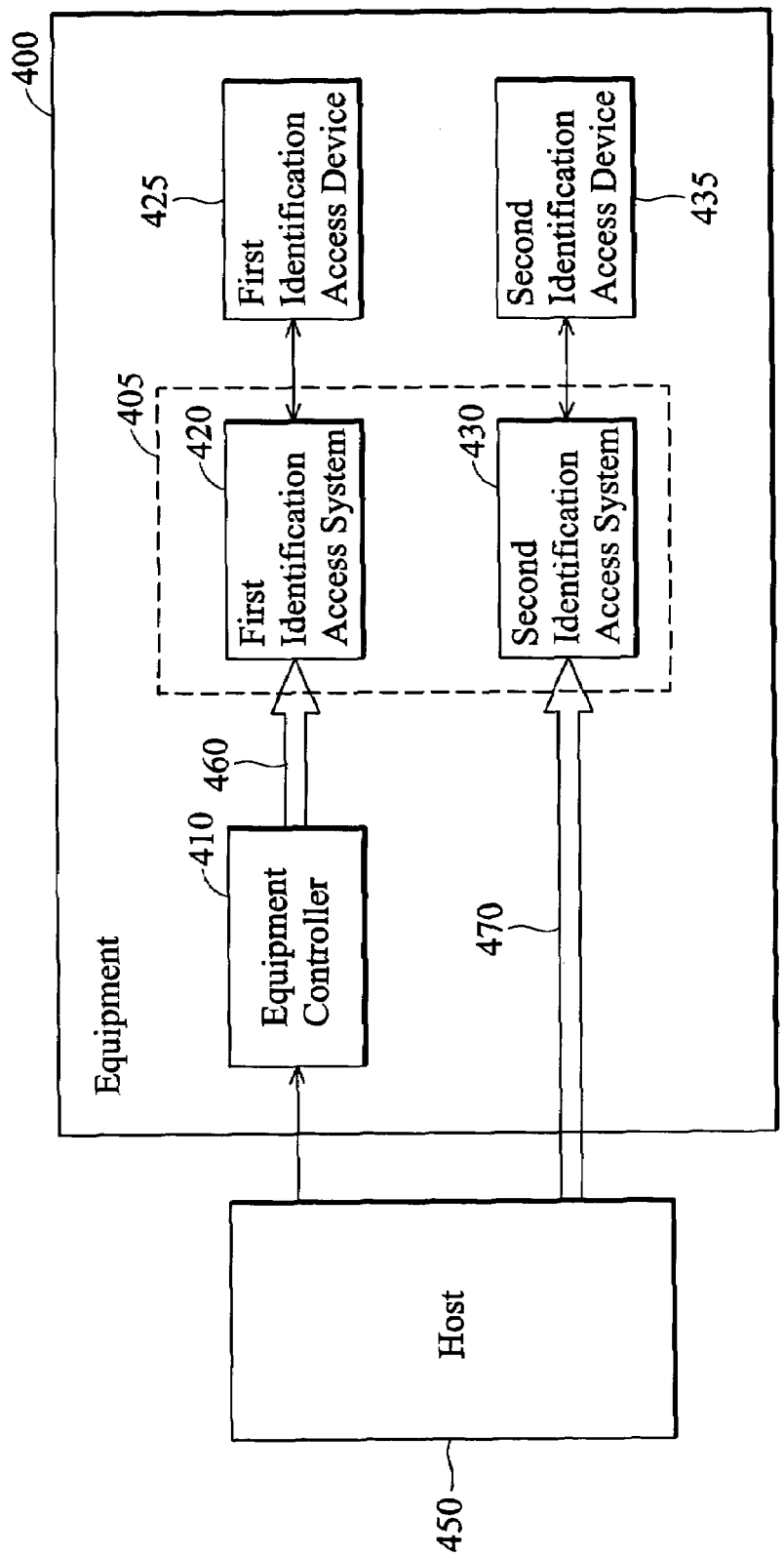
FIG. 4 is a diagram showing the architecture of the dual ID verification system according the present invention.

FIG. 4 shows the architecture of the dual ID verification system according to the present invention. The architecture comprises an equipment installation 400 and a host 450. The equipment installation 400 includes a control flow unit 405, an equipment installation controller 410, a first identification access device 425 and a second identification access device 435. The control flow unit 405 further comprises a first identification access system 420 and a second identification access system 430.

First, the equipment installation 400 issues a load complete message when the wafer carrier reaches the load port of the equipment installation 400 and the load button is activated. The appropriate system is chosen by a control method, and the first identification access system enters pre-determination readiness described below.

Equipment 400 issues an access request through the first wire link 460 to inform equipment controller 410 it will read the wafer carrier ID from first identification access device 425.

Next, the equipment installation 400 requests first identification access system 425 by an internal connection request to read the wafer carrier ID stored in first identification access device 425. When equipment 400 successfully reads the wafer carrier id, it issues a message comprising wafer carrier ID to the equipment installation controller 410, and equipment controller 410 informs host 450 of the message. When equipment 400 fails to read the wafer carrier id, it issues a failed-read message to the equipment installation controller 410, and then equipment controller 410 informs host 450 of the message.

The appropriate system is chosen in accordance with the wafer carrier ID by control flow unit 405. If the first system is chosen, pre-determination readiness of first identification access system 420 continues. The host 450 receives the message comprising wafer carrier ID from equipment controller 410.

If the second system is chosen, the host 450 controls and executes the second identification access system 430 via the second wire link 470. Furthermore, the system ignores identification information and events initiated by the first identification access system 420.

The chosen system receives the wafer carrier id, and the host 450 compares wafer carrier ID with product ID numbers from product ID table in MES. If the comparison is successful, the host 450 issues a proceed-process message to the equipment installation 400 to continue the manufacturing process. If not, the host 450 issues a cancel-process message to the equipment installation 400 to cancel the manufacturing process.

Figure 5:
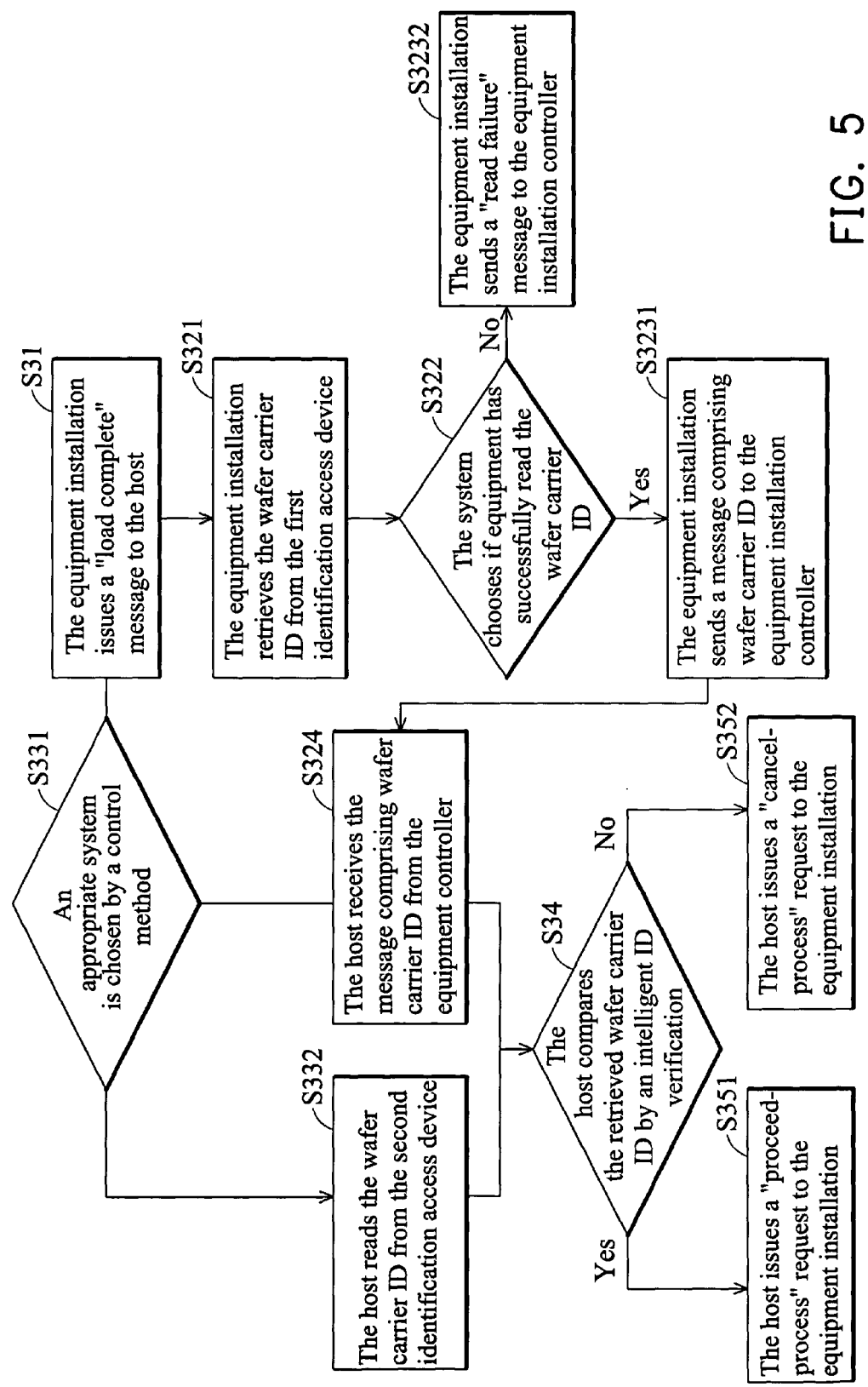
FIG. 5 is a flowchart of the detailed steps of the method for switching dual ID systems according to the present invention.

FIG. 5 is a flowchart of detailed steps of the method for switching dual ID verification systems according to the present invention.

First a production ID table is set internally in the host.

Steps S31→S321→S322→S323x→S324 are standard procedure complying with SEMI standard E87, a process of automated identification system with single communication connection. Steps S332→S34→S35x are the procedure applied in the host, a process of automated identification system with separate communication connection. Step S31 is a control flow to integrate the systems mentioned above.

In step S31, the equipment installation issues a "load complete" message to the host after the wafer carrier reaches the load port of the equipment installation and the load button thereof is activated.

In step S321, the equipment installation issues an access request through the first wire link to inform the equipment installation controller it will read the wafer carrier ID stored in the first identification access device. The equipment installation then requests the first identification access system by an internal connection request to retrieve the wafer carrier ID from the first identification access device.

In step S322, the system chooses if equipment has successfully read the wafer carrier ID.

In step S3231, the equipment installation sends a message comprising wafer carrier ID to the equipment installation controller if it has successfully read the wafer carrier ID, and the equipment installation informs the host of the transmission.

In step S3232, the equipment installation sends a "read failure" message to the equipment installation controller if it has failed to read the wafer carrier ID. Then equipment informs the host of the transmission.

In step S324, the host receives the message comprising wafer carrier ID from the equipment controller.

In step S331, the appropriate system is chosen by a switch method, automatically or manually performed. The system is determined by operators if it is manually performed, or is determined by a predetermined product variable if it is automatically performed If the first identification access system is chosen, the process goes to step S24.

In step S332, the host directly controls the second identification access system through the separate wire link and reads the wafer carrier ID from the second identification access device. Furthermore, the system ignores identification information and events initiated by the first identification access system.

In step S34, the host compares the retrieved wafer carrier ID with product ID numbers from a product ID table in MES. The retrieved wafer carrier ID is checked by an intelligent ID verification.

In step S351, the host issues a "proceed-process" request to the equipment installation to continue the manufacturing process if the intelligent ID verification is successful.

In step S352, the host issues a "cancel-process" request to the equipment installation to stop the manufacturing process if the intelligent ID verification is unsuccessful.

The invention integrates another carrier ID system on equipment complying with SEMI standard E87. It lowers costs by installing both systems on equipment, switched by a control flow without revising hardware architecture, and operators can choose an appropriate system according to real process situations.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for switching dual ID verification system, comprising steps of:

installing a first identification access system and a second identification access system on an equipment installation;

setting a product variable;

choosing the first identification access system or the second identification access system by a switch method;

sending an access request via a first wire link to instruct an equipment installation controller for the first identification access system to read the wafer carrier ID from a first identification access device if the first identification access system is chosen;

receiving of the wafer carrier ID through the first identification access system by a host; and retrieving the wafer carrier ID through the second identification access system by a host via a second wire link if the second identification access system is chosen.

2. The method as claimed in claim 1, wherein the switching step further comprises steps of:
  setting a product variable; and
  automatically switching the first identification access system and the second identification access system by the product variable.

3. The method as claimed in claim 1, wherein in the switching step, the first identification access system and the second identification access system are manually switched.

4. The method as claimed in claim 1, wherein the first identification access system complies with SEMI standard E87.

5. The method as claimed in claim 1, wherein step of retrieving the wafer carrier ID through the second identification access system further comprises:
  ignoring the wafer carrier ID information and events retrieved by the first identification access system.

6. The method as claimed in claim 1, wherein the first identification access system is an automated identification system with single communication connection.

7. A dual ID verification system comprising:
  a first identification access device for storing a wafer carrier id;
  a second identification access device for storing the wafer carrier id;
  an equipment controller for receiving an access request from the equipment;
  a host, coupled with the equipment installation controller, comprising a product ID table, for retrieving the wafer carrier id, the product ID table having a plurality of product ID numbers; and
  a control flow unit, coupled with the first identification access device, the second identification access device, the equipment installation controller, and the host, for choosing the first identification access system or the second identification access system installed on an equipment installation by a switch method, sending an access request via a first wire link to inform the equipment installation controller for the first identification access system to read the wafer carrier ID from a first identification access device if the first identification access system is chosen, retrieving the wafer carrier ID through the first identification access system by a host and retrieving the wafer carrier ID through the second identification access system by a host via a second wire link if the second identification access system is chosen.

8. The system as claimed in claim 7, wherein a product variable is set, and the first identification access system and the second identification access system are automatically switched by the product variable.

9. The method as claimed in claim 7, wherein the first identification access system and the second identification access system are manually switched.

10. The system as claimed in claim 7, wherein when the second identification access system is chosen, wafer carrier ID information and events retrieved by the first identification access system are ignored.

11. The system as claimed in claim 7, wherein the first identification access system is an automated identification system with single communication connection.

12. The system as claimed in claim 7, wherein the first identification access system complies with SEMI standard E87.

13. A dual ID verification system comprising:
  a control flow unit for choosing the first identification access system or the second identification access system installed on an equipment installation by a switch method, sending an access request via a first wire link to instruct an equipment installation controller for the first identification access system to read the wafer carrier ID from a first identification access device if the first identification access system is chosen, retrieving the wafer carrier ID through the first identification access system by a host, and retrieving the wafer carrier ID through the second identification access system by a host via a second wire link if the second identification access system is chosen.

14. The system as claimed in claim 13, wherein a product variable is set, and the first identification access system and the second identification access system are automatically switched by the product variable.

15. The method as claimed in claim 13, wherein the first identification access system and the second identification access system are manually switched.

16. The system as claimed in claim 13, wherein when the second identification access system is chosen, the wafer carrier ID information and events retrieved by the first identification access system are ignored.

17. The system as claimed in claim 13, wherein the first identification access system is an automated identification system with single communication connection.

18. The system as claimed in claim 13, wherein the first identification access system complies with SEMI E87.

* * * * *